G. B. HAKINS.
DENTAL CLEANING DEVICE.
APPLICATION FILED MAY 27, 1910.

1,014,594.

Patented Jan. 9, 1912.

UNITED STATES PATENT OFFICE.

GEORGE B. HAKINS, OF NORWOOD, NEW YORK.

DENTAL CLEANING DEVICE.

1,014,594. Specification of Letters Patent. Patented Jan. 9, 1912.

Original application filed March 26, 1908, Serial No. 423,432. Divided and this application filed May 27, 1910. Serial No. 563,790.

*To all whom it may concern:*

Be it known that I, GEORGE B. HAKINS, a citizen of the United States, residing at Norwood, in the county of St. Lawrence and State of New York, have invented new and useful Improvements in Dental Cleaning Devices, of which the following is a specification.

This application is a division and continuation of one filed by me, Serial No. 423,432.

This invention pertains to certain new and useful improvements in dental cleaning devices, and has for its object to provide a simple, compact, efficient and practicable device which includes sponge rubber as the cleaning medium.

Sponge rubber is possessed of certain peculiar characteristics which especially adapt it for cleaning purposes of which may be cited its extremely soft properties, which permit it, though driven at a high rate of speed, to come into contact with the gum or related parts of the mouth without perceptible pain or the slightest injury to the patient. Again its cleaning value is of high order and due to its great degree of compressibility it may, with comparatively slight pressure be brought to enter in the space between the teeth and at the juncture of the teeth with the gums to an extent impossible with the usual and well known hard rubber disks, or similar devices.

Figure 1:
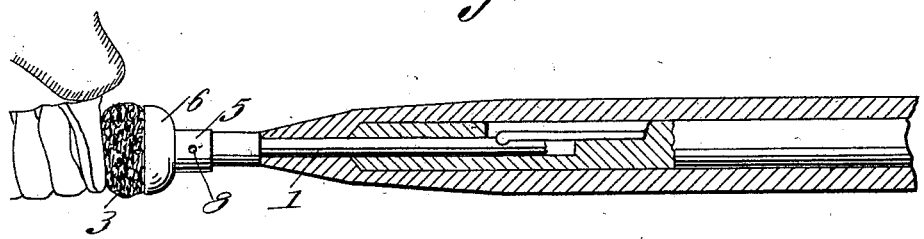
Figure 2:
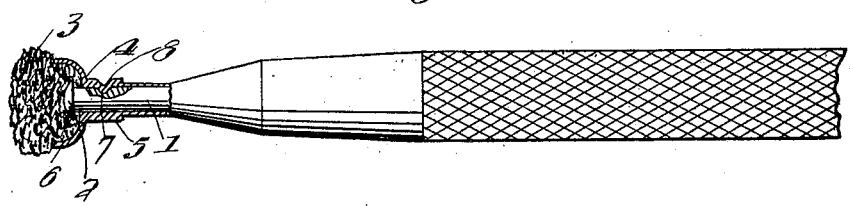
Figure 3:
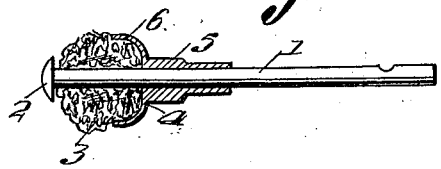

In the drawings—Figure 1, is a side elevation of the invention, partly in section, showing the manner of use in cleaning the teeth, Fig. 2, is a similar view showing the means for securing the sponge rubber in section, and Fig. 3 is a sectional view showing the mode of assemblage prior to the parts being brought to normal position.

The drawings illustrate the invention as applied to the well known mandrel rotating means or chuck of a dental engine, the mandrel 1, having its chuck engaging end of any desired type. Secured to the front end of the mandrel in suitable rigid relation is a small disk 2, of a diameter slightly greater than that of the mandrel.

3 designates the mass or body of sponge rubber, which may be cut or subsequently trimmed by the operator to meet certain conditions or requirements governed by the contemplated use, the body, in the process of securement, being penetrated by the shank of disk 2, shown more clearly in Fig. 3, and being firmly clamped between the rear face of the latter and the inner face of a cup-shaped member 4. This member 4 is formed with a sleeve 5, and a curved body 6 of bowl-shape, or cup-form, there being a space between the disk and the inner face of the body 6 in which the sponge rubber projects so as to be clamped. It will be noted that the outer peripheral end of body or cup 6 projects comparatively for quite a distance beyond the disk 2, the purpose of which is to provide a bed or compression chamber whereby when the mass of sponge rubber is brought to bear with great pressure on the teeth, that portion of the sponge rubber in the cup will have certain limitations of movement prescribed by the bounding wall of the cup and as a consequence the sponge rubber will not be permitted to expand but will be compressed within the cup, thus affording a firm though resilient bed for that portion of the sponge rubber without the cup. As the drawings clearly manifest, the expansive properties of the rubber will cause it to extend beyond the peripheral edge of the cup, thus protecting the parts being treated against contact with the hard substance of which the cup is made.

In order to immovably relate sleeve 5 to mandrel 1, I form a recess 7, in the latter in which projects a struckout portion 8 of the sleeve.

It may be mentioned that a further contemplated use to which the invention is put, is that of cleaning and polishing finger nails.

What I claim is:

1. In a cleaning device, a mandrel having a rigid enlarged part on its free end, a cup-shaped element carried by the mandrel, a mass of sponge-rubber in the cup-shaped element, said mandrel being passed through said mass of sponge-rubber to cause the latter to be clamped in compressed state between said enlarged part of the mandrel and the base of the cup-shaped element whereby the outer portions of the mass of sponge-rubber will, due to the expansive properties thereof, project beyond the free end of the cup-shaped element.

2. In a cleaning device, a mandrel having a rigid enlarged part on its free end, a cup-shaped element carried by the mandrel, a mass of sponge-rubber in the cup-shaped element, said mandrel being passed through said mass of sponge-rubber to cause the latter to be clamped in compressed state between said enlarged part of the mandrel and the base of the cup-shaped element whereby the outer portions of the mass of sponge-rubber will, due to the expansive properties thereof, project beyond the free end of the cup-shaped element, a sleeve formed on said element and surrounding the mandrel, said sleeve being formed with a struck-out part which projects in a recess provided therefor in the mandrel.

In testimony whereof I have hereunto set my hand in presence of two subscribing witnesses.

GEORGE B. HAKINS.

Witnesses:
I. P. VANCE,
H. W. TURNER.